United States Patent
Kempen et al.

(10) Patent No.: US 10,326,274 B2
(45) Date of Patent: Jun. 18, 2019

(54) ARRANGEMENT COMPRISING AN ENERGY STORAGE DEVICE FOR RECEIVING ELECTRICAL ENERGY FROM AN ELECTRICAL NETWORK AND DISCHARING ELECTRICAL ENERGY TO THE ELECTRICAL NETWORK

(71) Applicant: AEG Power Solutions GmbH, Warstein-Belecke (DE)

(72) Inventors: Stefan Kempen, Arnsberg (DE); Andreas Becker, Korbach (DE); Dieter Brandt, Warstein (DE)

(73) Assignee: AEG Power Solutions GmbH, Warstein-Belecke (DE)

( * ) Notice: Subject to any disclaimer, the term of this patent is extended or adjusted under 35 U.S.C. 154(b) by 0 days.

(21) Appl. No.: 15/710,630

(22) Filed: Sep. 20, 2017

(65) Prior Publication Data

US 2018/0083448 A1    Mar. 22, 2018

(30) Foreign Application Priority Data

Sep. 20, 2016 (EP) .................................... 16189632

(51) Int. Cl.
*H02J 3/32* (2006.01)
*H02J 3/24* (2006.01)

(52) U.S. Cl.
CPC . *H02J 3/32* (2013.01); *H02J 3/24* (2013.01)

(58) Field of Classification Search
CPC ...... H02J 3/24; H02J 3/32; H02J 3/385; H02J 7/35

(Continued)

(56) References Cited

U.S. PATENT DOCUMENTS

| 2014/0049109 A1* | 2/2014 | Kearns ................. H02J 3/00 307/52 |
| 2017/0102433 A1* | 4/2017 | Wenzel ............. G01R 31/3651 |
| 2017/0104449 A1* | 4/2017 | Drees ..................... H02J 3/386 |

FOREIGN PATENT DOCUMENTS

| DE | 1813853 A1 | 7/1970 |
| WO | 2007104167 A1 | 9/2007 |

(Continued)

OTHER PUBLICATIONS

European Search Report in corresponding European Patent Application No. 16189632.9, dated Feb. 17, 2017, with English translation.

*Primary Examiner* — Edward Tso
*Assistant Examiner* — Aaron Piggush
(74) *Attorney, Agent, or Firm* — Edell, Shapiro & Finnan, LLC

(57) ABSTRACT

An arrangement for receiving electrical energy from a power grid and for discharging electrical energy to the power grid comprises: a converter to convert from AC to DC and vice versa and a control device. The converter includes: a power unit connected on one side to a DC I/O and on another side to an AC I/O; an energy storage device; an energy-converter; and a changeover mechanism to which the energy storage device or the energy-converter is connected via the DC I/O. The control device controls the changeover mechanism such that a neutral state is a state of charge of the energy storage device between 50% and 100%; and at or above the neutral state, the changeover mechanism connects the DC I/O of the converter to the energy-converter at a network frequency higher than a nominal network frequency plus a predetermined, non-zero amount.

13 Claims, 4 Drawing Sheets

(58) Field of Classification Search
USPC .......................... 320/134, 138, 142, 145, 155
See application file for complete search history.

(56) References Cited

FOREIGN PATENT DOCUMENTS

| WO | 2014177175 A1 | 11/2014 |
| WO | 2014177264 A2 | 11/2014 |
| WO | 2015165517 A1 | 11/2015 |

* cited by examiner

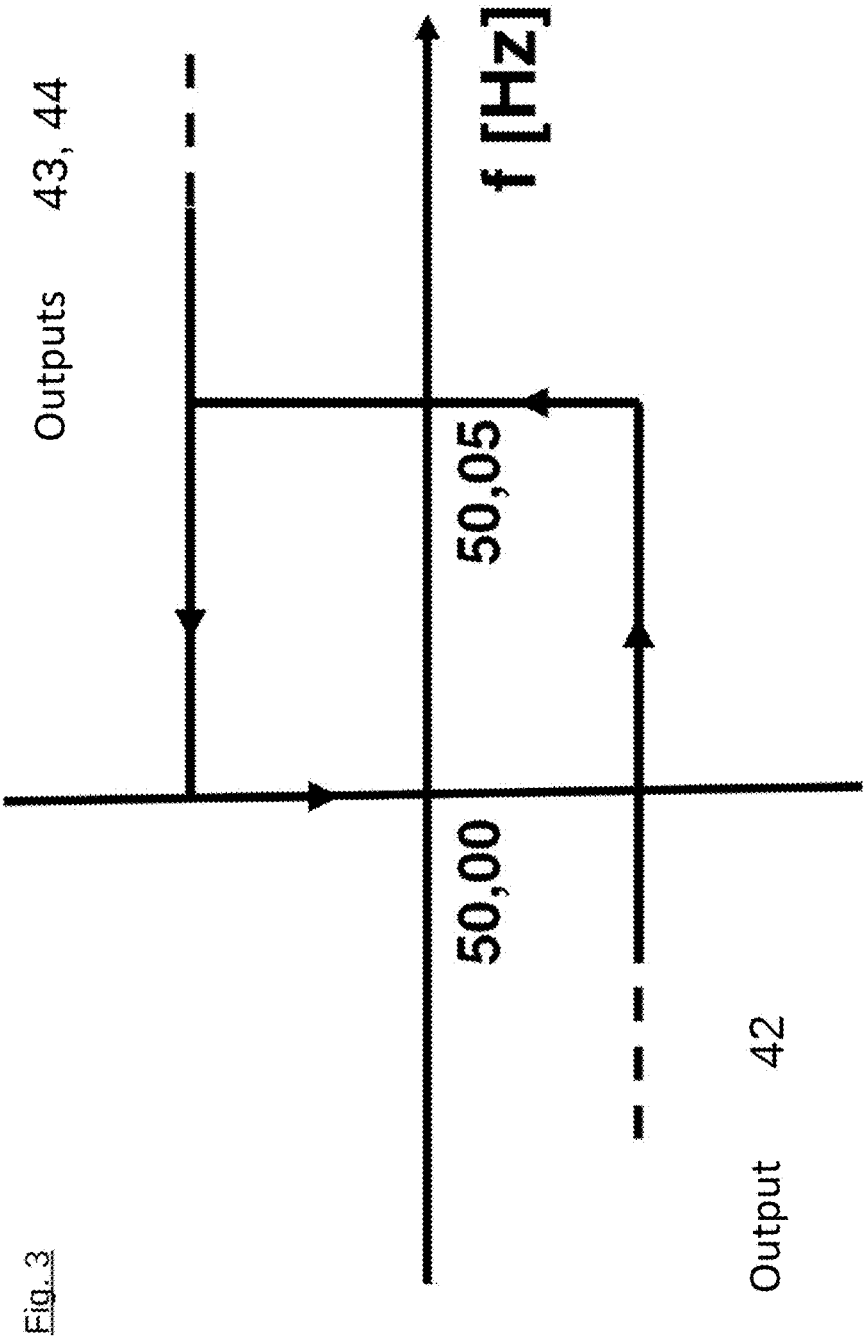

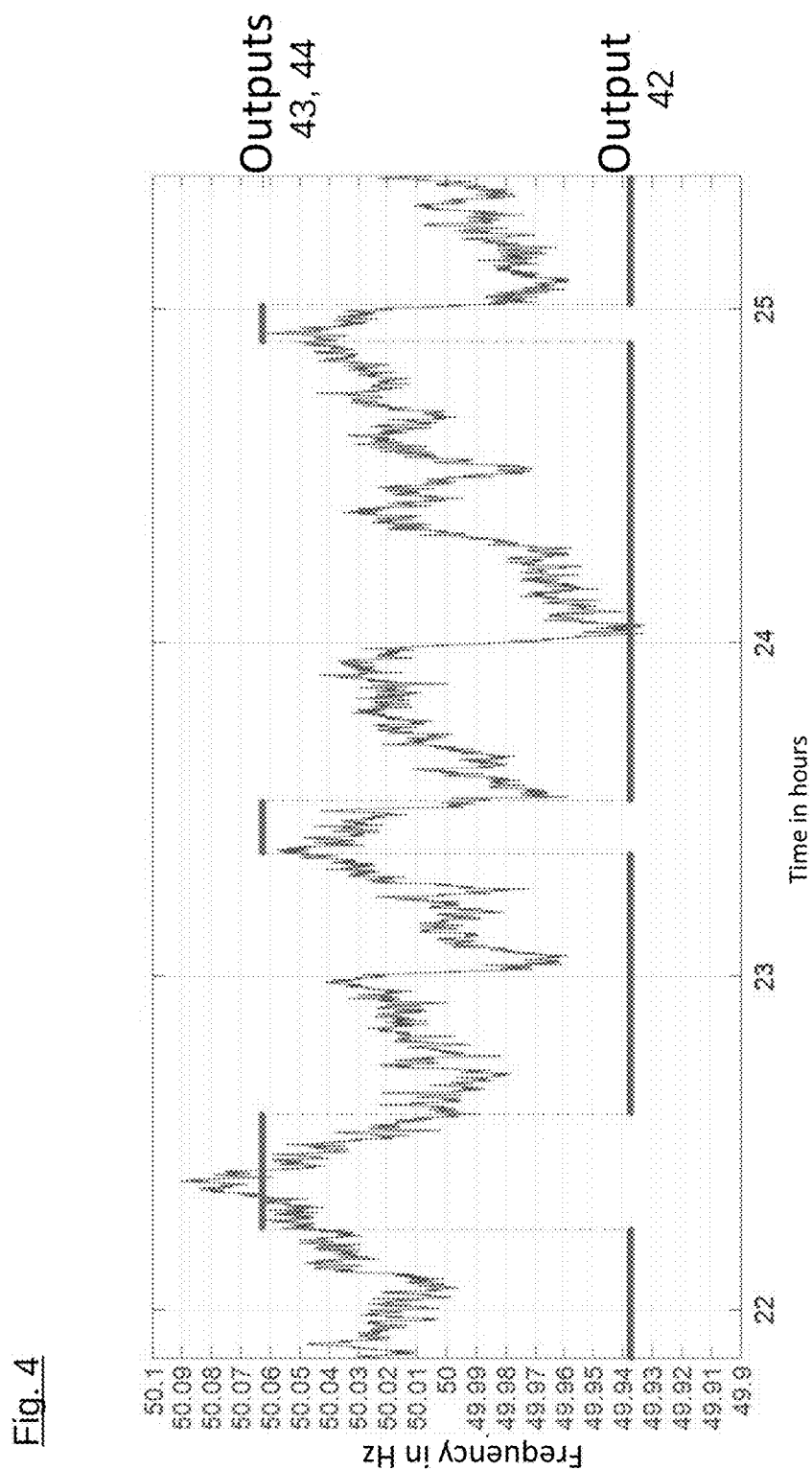

ARRANGEMENT COMPRISING AN ENERGY STORAGE DEVICE FOR RECEIVING ELECTRICAL ENERGY FROM AN ELECTRICAL NETWORK AND DISCHARING ELECTRICAL ENERGY TO THE ELECTRICAL NETWORK

CROSS REFERENCE TO RELATED APPLICATIONS

This application claims foreign priority under 35 U.S.C. § 119(a)-(d) to Application No. EP 16189632.9 filed on Sep. 20, 2016, the entire contents of which are hereby incorporated by reference.

BACKGROUND

It is possible with battery storage devices to receive electrical energy from the grid, if more active power is available from the power generators connected to the grid than is presently required by the consumers connected to the grid. The operator of the battery storage may not, however, indiscriminately accept power from the grid and provide power. Instead, guidelines are set by the network operator which the operator of the battery storage has to satisfy. In particular, guidelines are set by the network operator for the provision of so-called primary control power. The guidelines lead to an agreement between the operator of the battery storage and the network operator, which establishes the primary control power that a battery storage system is guaranteed to be able to remove or provide within a specific time.

The state of charge of the energy storage device, at which the arrangement for receiving electrical energy from a power grid and for discharging electrical energy to the power grid may provide the guaranteed primary control power and also receive the guaranteed primary control power, is designated as the neutral state. In this state of charge, the energy storage device may discharge a sufficiently large discharge current or receive a sufficiently large charging current at a specified nominal voltage of the energy storage device in order to provide the guaranteed primary control power or to receive the same from the grid. The neutral state of the battery storage system is a value that results directly from the guaranteed primary power or—in case the guaranteed primary power is regularly redefined by agreements between the operator of the arrangement for receiving electrical energy from a power grid and for discharging electrical energy to the power grid and the network operator—results from the maximal guaranteeable primary control power.

Accordingly, in the past, battery storage systems were designed such that the neutral state is achieved in such storage systems at a state of charge SOC=50%. At a state of charge SOC=50%, a sufficiently large current could then be received or discharged at the nominal voltage of the battery storage system, in order to receive or discharge the guaranteed primary control power.

The setting of the neutral state to the state of charge SOC=50% necessitated that battery storage in the past was very large and correspondingly expensive.

The performance of the battery storage, required in the past for providing primary control power, and the costs connected thereto have been reasons to search for solutions in recent times, such as those described at the outset.

European patent application 15 187 205 describes one such solution. A similar device is disclosed in document WO 2014/177 175 A1.

The arrangement described in European patent application 15 187 205 for receiving electrical energy from an electrical grid and for discharging electrical energy to the electrical grid solves the problem of reducing the battery storage provided as the energy storage device. This is achieved in that, unlike previously-known arrangements for accepting electrical active power, the energy-converter is made available as well as the battery storage. The provision of electrical active power is carried out, in contrast, only by the battery storage. Since the energy-converter may receive power from the grid, it is possible to reduce the output and thus the size of the battery storage by approximately 50%. The neutral state may then be specified at the maximum charge (SOC=100%) of the battery storage. In the neutral state, the guaranteed output is available to be discharged to the network. It is likewise possible that the guaranteed output may be received from the grid in the neutral state. The power is then used, however, by the energy-converter to convert the energy removed from the network into heat. Storage in the energy storage device is not possible.

If, in such an arrangement according to European patent application 15 187 205, the state of charge is below the neutral state, and active power is to be received from the grid, then initially the battery storage is brought up to the neutral state. If the neutral state is achieved and additional power is to be received, then the received power is used to convert electrical energy into heat. The changeover mechanism is then used for this purpose, which connect the direct current input and output either to the energy-converter or to the energy storage device, thus to the battery storage.

One may use the frequency of the network voltage to detect whether active power is to be received from the grid or whether active power is to be provided to the grid. In the case of an upwards deviation of the network frequency from the nominal network frequency, then power should be received; in the case of a downwards deviation from the nominal network frequency, then power should be provided.

Studies by the applicant have shown that the frequency of the network very often deviates above or below the nominal network frequency by only small amounts. This leads, in the case of a battery storage of an arrangement according to European patent application 15 187 205 in the neutral state, to the fact that the changeover mechanism is often switched in order to connect the direct current input and output of the converter to the energy storage device, whenever the frequency fluctuates around the nominal network frequency. Each time that the nominal network frequency is exceeded in the neutral state, the direct current input and output of the converter are connected to the energy-converter by the changeover mechanism. In addition, the changeover mechanism always connect the direct current input and output of the converter to the energy storage device, whenever the frequency drops below the nominal network frequency, e.g., 50 Hz.

Due to the frequent fluctuation of the network frequency around the nominal network frequency, frequent switching operations also occur.

The frequent switching operations severely load the changeover mechanism such that, if electromechanical switches are used in the changeover mechanism, they must be already replaced after a few months, since the number of switches, for which they were designed, has already been reached.

Instead of electromechanical switches, power electronic circuits may also be used. However, in comparison to electromechanical switches, these are expensive and lead to increased losses.

As a result, a known arrangement of the type listed at the outset may not be operated with the economic advantages that are desired.

SUMMARY

The present invention relates to an arrangement for receiving electrical energy from a power grid and for discharging electrical energy to the power grid, comprising: a converter for converting from alternating current into direct current and vice versa, wherein the converter has a direct current input and output, an alternating current input and output, and a power unit with power semiconductor devices, the power unit being connected on the one side to the direct current input and output and on the other side to the alternating current input and output; an energy storage device, in particular, a battery storage made from secondary cells; an energy-converter, in particular, a heat generator; and a changeover mechanism to which either the energy storage device or the energy-converter is connectable using the direct current input and output.

The underlying object of the present invention is to change an arrangement of the type listed at the outset so that it may be operated more economically.

This problem is then solved according to the invention in that the arrangement has a control device for controlling the changeover mechanism. The control device is designed such that, in the case of the arrangement according to the invention, the neutral state is determined at a state of charge of the energy storage device of between 50% and 100%, preferably at a state of charge between 80 and 95%. The control device is further designed such that, in the neutral state or in a state of charge higher than in the neutral state yet lower than the 100% state of charge, the changeover mechanism connects the direct current input and output of the converter to the energy-converter at a network frequency which is higher than the nominal network frequency by a predetermined amount, the amount being unequal to zero.

In contrast to the arrangement described in European patent application 15 187 205, the particular aspect of the arrangement according to the invention lies in that, in the neutral state or in a state of a higher charge of the energy storage device, the received power does not have to be converted in the energy-converter in every case of a demand for power consumption from the network, and the changeover mechanism does not have to connect the energy-converter to the converter for this purpose. Instead, it is possible to initially use the output to store energy in the energy storage device. Only when the energy storage device reaches a state of charge of 100% and/or the network frequency is higher than the nominal network frequency by the predetermined amount, is the output accepted by the energy-converter and used to generate heat. The predetermined amount may be 0.05 Hz.

Thus, a switching operation does not directly occur in the changeover mechanism in the neutral state or in a state of charge between the neutral state and a state of charge of 100%, neither during a power discharge to the network, nor during low power consumption from the network. The changeover mechanism is thus only controlled to connect the direct current input and output of the converter to the energy-converter when either the power consumption exceeds a specified threshold value, which is detectable at the network frequency, or the energy storage device may no longer accept energy, which occurs when the state of charge reaches 100%.

According to the invention, the control device may be designed such that, in a neutral state or in a state of charge between the neutral state and a state of charge of 100%, the changeover mechanism is operated as a two-point switch, whose input variable, i.e. the variable triggering the switching operation, is the network frequency.

The changeover mechanism may, for example, be operated as a two-point switch without hysteresis. Switching then occurs according to the invention upon reaching the nominal network frequency plus the predetermined amount. Indeed, in the arrangement described in the European patent application 15 187 205, the changeover mechanism is operated as a two-point switch without hysteresis. The changeover is always carried out in the arrangement described in European patent application 15 187 205 upon reaching the nominal network frequency. By displacing the switching threshold, at which the changeover occurs, by the predetermined amount, the number of changeovers may be significantly reduced in the case of a skilled determination of the predetermined amount, for example, at 0.05 Hz.

The changeover mechanism may also be operated as a two-point switch with hysteresis, whose input variable is the network frequency. This arrangement according to the invention, in particular its control device, may be designed such that, in a neutral state or in a state of charge between the neutral state and a state of charge of 100%, the changeover mechanism switch, when the network frequency is increasing, upon reaching an upper threshold value, namely the nominal network frequency plus the predetermined amount, from a connection of the direct current input and output of the converter to the energy storage device to a connection of the direct current input and output of the converter to the energy-converter. Furthermore, the arrangement according to the invention, in particular its control device, may be designed such that, in a neutral state or in a state of charge between the neutral state and a state of charge of 100%, the changeover mechanism switch, when the network frequency is decreasing, upon reaching lower threshold value, namely the nominal network frequency, from a connection of the direct current input and output of the converter to the energy-converter to a connection of the direct current input and output of the converter to the energy storage device.

Due to the hysteresis, the number of switching operations may be reduced even more significantly over an arrangement in which it is switched without hysteresis, but with a switching threshold of a nominal network frequency plus the predetermined amount.

The control device of a device according to the invention may also be suitable for and designed to control the converter. Then the charging current and/or the charging voltage of the energy storage device may be set using the converter and the control device. An additional charging regulator is then not necessary. Furthermore, it may be possible that the power unit may be controlled using the control device such that the changeover mechanism is de-energized at the moment of a switching operation. Electromechanical switches of the changeover mechanism may thus be actuated current-free.

An arrangement according to the invention may have a measuring device with which the network frequency may be measured. The measuring device may have a measuring signal output, which is connected to a measuring signal input of the control device.

The changeover mechanism may have one or more controllable electromechanical switches, in particular, relays or contactors, which have control signal inputs that are connected directly or indirectly with first control signal outputs of the control device. It is basically also possible to use power semiconductor switches. Due to the lower price, electromechanical switches are the preferred selection for the invention by a person skilled in the art.

In contrast, the converter preferably has power semiconductor devices, which have control signal inputs that are connected directly or indirectly to second control signal outputs of the control device. Power semiconductor switches would be advantageous over electromechanical switches in the converter due to the frequent switching operations during conversion of the current between the direct current input and output and the alternating current input and output of the converter.

The topology of an arrangement according to the invention may provide at least one transformer, which has a primary winding that is connected to a network input and output of the arrangement. The transformer may have a secondary winding that is connected to the alternating current input and output of the converter.

It is just as possible that an arrangement according to the invention has at least one transformer, and a pair of converters is assigned to this at least one transformer, and changeover mechanism is assigned to each of these converters. In this case, the transformer may have a primary winding that is connected to a network input and output of the arrangement. It may then also have two secondary windings, wherein each secondary winding may be connected via an alternating current input and output of one of the converters, via this converter and its direct current input and output, to the changeover mechanism assigned to this converter. An advantage of such an arrangement is that costs may be saved by using one transformer with three winding materials over the use of two transformers with two winding materials, without this being at the expense of the functions of the arrangement. In addition, it is possible to selectively energize one or both converters connected to the transformer in order to adjust the power to be received from the network or the power to be supplied to the network.

It is possible that, in an arrangement according to the invention, multiple transformers are provided with a primary winding and two secondary windings, wherein a pair of converters is assigned to each of the transformers, and changeover mechanism are assigned to each converter. In such an arrangement, it is possible to receive power from the network in multiple steps, and to supply power to the network in multiple steps. Depending on how much power is to be removed from or supplied to the network, one, multiple, or all of the converters are energized in order to transport electrical energy from the network or to the network.

The converter(s) of an arrangement according to the invention may be configured and/or controlled or regulated by the control device such that the power, which is removed from the network or supplied to the network by each converter, may be adjusted.

The energy-converter of an arrangement according to the invention may comprise multiple electrical heat-generators, for example, heating resistors, which are connected in parallel by pairs to a direct current input and output via one of the changeover mechanism.

An energy storage device with a battery storage may be connected downstream of each changeover mechanism of an arrangement according to the invention.

Each battery storage may have battery monitor that is connected to the control device. The battery monitor may function in particular for detecting a fault or a complete or partial failure of a battery storage.

BRIEF DESCRIPTION OF THE DRAWINGS

Other characteristics and benefits of the present invention become apparent based on the following description of a preferred embodiment by referencing the included figures. As seen in.

DETAILED DESCRIPTION

Figure 1:
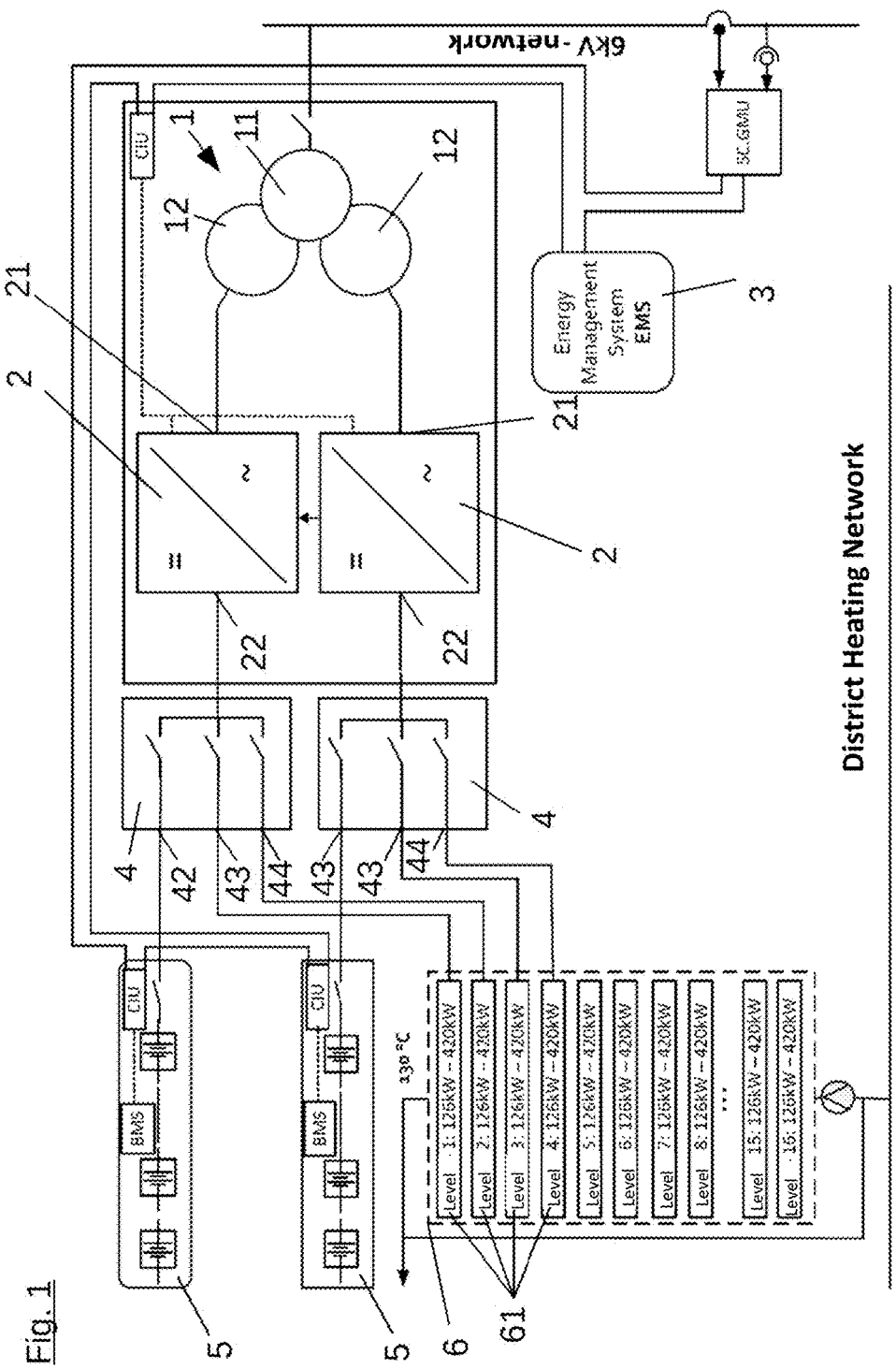
FIG. 1 a principle block diagram of an arrangement according to the invention, FIG. 2 an exemplary distribution of the frequencies in a distribution network, FIG. 3 a transmission function of the changeover mechanism, FIG. 4 an exemplary frequency progression and the progression of the state of the changeover mechanism resulting therefrom.

The arrangement according to the invention depicted in the principle block diagram (FIG. 1) has a network input which is connected to a primary winding 11 of transformer 1. Each transformer 1 has two secondary windings 12.

A converter 2 is connected to each of the secondary windings 12. For this purpose, each converter 2 has an alternating current input and output 21, to which the assigned secondary winding 12 is connected. In addition, each converter has a power unit which is designed preferably from power semiconductor devices. Alternating current input and output 21 of each converter 2 is connected to a direct current input and output 22 of converter 2 via the power unit. A control input 23 of each converter 2 is connected to a control device 3 of the arrangement.

Direct current input and output 22 of each converter 2 is connected to a common input and output 41 of changeover mechanism 4, which, in addition to a control input 45, has an input and output 42 for an energy storage device 5 on the one side and on the other side two parallel-connected outputs 43, 44 for energy-converter 6. Each changeover mechanism 4 is designed such that either input and output 42 or parallel actuated outputs 43, 44 is/are connected to the common input and output 41. The state of the changeover mechanism 4 is controlled by control device 3. The changeover mechanism 4 is preferably made from electromechanical switches, such as relays or contactors.

Each energy storage device 5 is a battery storage in the embodiment.

Energy-converter 6 comprises multiple electric heat generators 61, of which each is connected to one of the parallel-connected outputs 43, 44 of changeover mechanism 4. Heat generators 61 are preferably identical or preferably have an identical electrical output and heat water in a district heating network in the example. Additional heat generators of energy-converter 6 may be connected to additional changeover mechanism, converters, and transformers.

In the embodiment depicted, a total of four transformers 1 are provided, which are not all depicted in FIG. 1. Two converters 2 are assigned to each of these four transformers 1. Changeover mechanism 4 is assigned to each converter 2, and an energy storage device 5 and two heat generators 61 of energy-converter 6 are assigned to each changeover mechanism 4.

The capacity of the battery storage defines the maximum guaranteeable primary control power that an operator of the arrangement according to the invention could agree upon with a network operator. The neutral state of the energy storage devices then arises from the actually agreed upon guaranteed primary control power. If the maximum guaranteeable primary control power is agreed upon as the guaranteed primary control power, then the neutral state in the arrangement according to the invention is determined at approximately SOC=90%. If the agreed upon primary control power is lower, then the neutral state may be determined at a lower state of charge; however, it does not have to be. In the neutral state, the energy storage devices are also able, to a certain extent, to receive power from the network and use it for charging the energy storage devices.

Control device 3 is programmed such that converter 2 may be operated as a rectifier when energy or power is removed from the network, and may be operated as a converter when energy or power is discharged to the network.

Control device 3 is additionally programmed (see FIG. 3), such that, when the nominal network frequency is exceeded by the network frequency, the changeover mechanism connect at least the input and output 42 of at least one of changeover mechanism 4 for the connected energy storage device 5 to the common input and output 41 of said changeover mechanism 4. Upon the network frequency exceeding the nominal network frequency plus a predetermined amount, the two parallel actuated outputs 43, 44 for the connected heat generator of energy-converter 6 of one of the changeover mechanism are connected to common input and output 41 of this changeover mechanism 4 by the control device, which is correspondingly programmed for this purpose. In a frequency range between the nominal frequency and the frequency value increased by the predetermined amount, in the example these are 50 Hz and 50.05 Hz, a hysteresis functions which ensures that a switch position is selected in which input and output 42 is connected to common input and output 41 when, starting at a frequency that is higher than the nominal network frequency plus the predetermined amount, the dropping frequency reaches the nominal frequency. In contrast, when starting from a frequency that is lower than the nominal frequency, changeover mechanism 4 is switched so that the two parallel actuated outputs 43, 44 are connected to common input and output 41 only when a frequency identical to the nominal network frequency plus the predetermined amount is reached.

Figure 2:
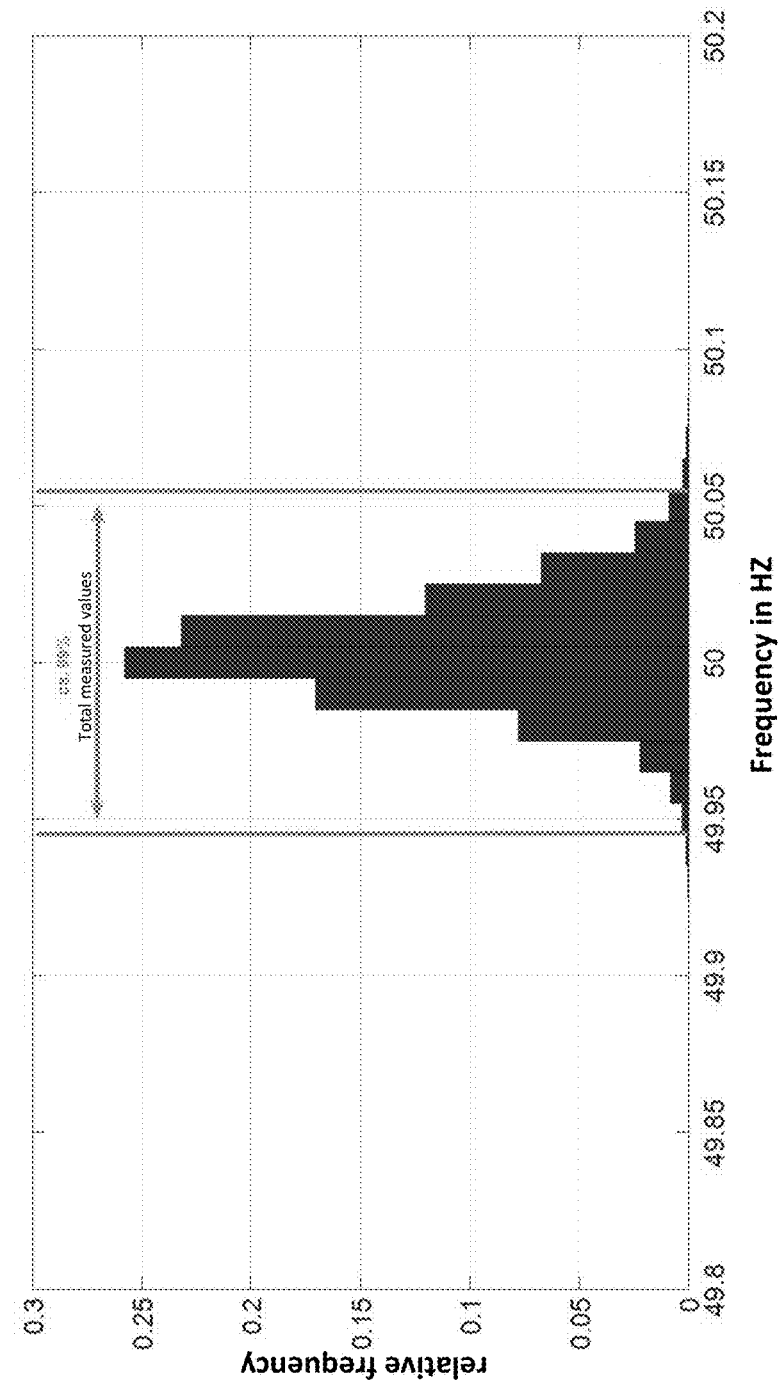

The advantage of the invention is particularly clear from FIGS. 2 and 4. FIG. 2 shows the frequency range in which, starting from the nominal network frequency, energy storage devices 5 are connected via changeover mechanism 4 to converter 2 and finally to the network. It also shows the frequency range in which energy-converter 6 are quite securely connected to converter 2 and to the network. Finally, FIG. 2 shows the exemplary distribution of the network frequency across this frequency range. It shows that virtually the overwhelming proportion of the values that the network frequency has adopted in the examined period lies in a frequency band of 50 Hz±0.05 Hz. Starting from the nominal network frequency, a switching operation in changeover mechanism 2 will seldom occur in an arrangement according to the invention. FIG. 4 also confirms this, in which the progression of the network frequency and the switching operations of the changeover mechanism are depicted in an exemplary way. If, in particular, the fluctuations of the network frequency around the nominal network frequency of 50 Hz from FIG. 4 are considered, it is quickly clear to a person skilled in the art that substantially more switching operations occur in the solution known from European patent application 15 187 205, which may wear out the electromechanical switches of the changeover mechanism.

What is claimed is:

1. An arrangement for receiving electrical energy at a network frequency from a power grid and for discharging electrical energy to the power grid, comprising:
   at least one converter to convert from alternating current into direct current and vice versa, wherein the converter includes:
      a direct current input and output;
      an alternating current input and output coupled to the power grid; and
      a power unit with power semiconductor devices, the power unit being connected on one side to the direct current input and output and on the other side to the alternating current input and output;
   at least one energy storage device comprising secondary cells;
   at least one energy-converter comprising a heat generator;
   at least one changeover mechanism to which either the energy storage device or the energy-converter is connected using the direct current input and output; and
   a control device configured to control the at least one changeover mechanism, wherein the control device is configured such that:
      a neutral state is determined at a state of charge of the energy storage device of greater than 50%; and
      in a state of charge of the energy storage device at or above the neutral state, the changeover mechanism connects the direct current input and output of the converter to the energy-converter at a network frequency that is higher than a nominal network frequency plus a predetermined amount, the amount being unequal to zero.

2. The arrangement of claim 1, wherein the control device is configured such that, in a state of charge of the energy storage device at or above the neutral state, the changeover mechanism connects the direct current input and output of the converter to the energy storage device or to the energy-converter at a network frequency that is higher than the nominal network frequency but lower than the nominal network frequency plus a predetermined, non-zero amount.

3. The arrangement of claim 1, wherein the control device is configured such that, in a state of charge of the energy storage device at or above the neutral state, the changeover mechanism connects the direct current input and output of the converter to the energy storage device at a network frequency that is lower than the nominal network frequency.

4. The arrangement of claim 1, wherein the control device is configured to control the at least one converter, and the charging current and/or the charging voltage of the energy storage device is adjustable using the converter and the control device.

5. The arrangement of claim 1, further comprising a measuring device to measure network frequency, wherein the measuring device has a measuring signal output that is connected to a measuring signal input of the control device.

6. The arrangement of claim 1, wherein the changeover mechanism has one or more relays or contactors, which have control signal inputs that are connected directly or indirectly to first control signal outputs of the control device.

7. The arrangement of claim 1, wherein the power semiconductor devices of the power unit of the converter have control signal inputs that are connected directly or indirectly to second control signal outputs of the control device.

8. The arrangement of claim 1, further comprising at least one transformer with a primary winding connected to a power grid network input and output of the arrangement, and a secondary winding connected to the alternating current input and output of the converter.

9. The arrangement of claim 1, further comprising:
at least one transformer;
one pair of converters assigned to the at least one transformer; and
one changeover mechanism assigned to each of the converters,
wherein the transformer has a primary winding connected to a power grid network input and output of the arrangement, and two secondary windings, wherein each secondary winding is connected via an alternating current input and output of one of the converters, via the converter and its direct current input and output to the changeover mechanism assigned to the converter.

10. The arrangement of claim 9, wherein the arrangement has multiple transformers with one primary winding and two secondary windings, to which one pair of converters is respectively assigned, to each of which one changeover mechanism is assigned.

11. The arrangement of claim 10, wherein the energy-converter comprises multiple electrical heat-generators that are connected in parallel by pairs to a direct current input and output via one of the changeover mechanism.

12. The arrangement of claim 1, wherein an energy storage device with a battery storage is connected downstream of each changeover mechanism.

13. The arrangement of claim 12, wherein the battery storage has a battery monitor connected to the control device.

* * * * *